United States Patent [19]

Spaulding et al.

[11] 4,000,493
[45] Dec. 28, 1976

[54] ACOUSTOOPTIC SCANNER APPARATUS AND METHOD

[75] Inventors: Richard A. Spaulding; Royce D. Pickering, both of Rochester, N.Y.

[73] Assignee: Eastman Kodak Company, Rochester, N.Y.

[22] Filed: Nov. 3, 1975

[21] Appl. No.: 628,182

Related U.S. Application Data

[63] Continuation of Ser. No. 132,955, April 12, 1971, abandoned.

[52] U.S. Cl. .......................... 346/1; 340/173 LM; 346/108; 350/161 W; 354/5
[51] Int. Cl.² ........................................ B41B 21/24
[58] Field of Search .............. 346/1, 108; 354/5, 7; 178/6.7 R, 15, 30, 7.3 D; 350/160 R, 161; 340/173 LM, 173 LS

[56] References Cited

UNITED STATES PATENTS

| | | | |
|---|---|---|---|
| 2,155,660 | 4/1939 | Jeffree | 178/7.3 D |
| 2,632,048 | 3/1953 | Mason | 178/7.3 D |
| 2,909,972 | 10/1959 | De Lano | 354/17 |
| 3,055,258 | 9/1962 | Hurvitz | 350/161 |
| 3,165,045 | 1/1965 | Troll | 354/5 |
| 3,314,073 | 4/1967 | Becker | 346/76 |
| 3,611,405 | 10/1971 | Chang | 346/108 |
| 3,653,067 | 3/1972 | Anderson | 346/108 |
| 3,744,039 | 7/1973 | Hrber | 340/173 LM |

OTHER PUBLICATIONS

Baker, Charles E., Laser Display Technology, IEEE Spectrum, Dec. 1968, pp. 39-50.

*Primary Examiner*—Joseph W. Hartary
*Attorney, Agent, or Firm*—Milton S. Sales

[57] ABSTRACT

An apparatus and method for laser-beam modulation and deflection wherein stored information is recorded on a photosensitive or other recording medium with a laser or other light beam. A plurality of separate frequencies is induced by a transducer on an acoustooptic light-modulating cell which carries and develops every frequency separately. The light beam is passed through the acoustooptic cell which modulates the light by Bragg reflection in accordance with the frequencies impressed thereon. The modulated light beams transmitted from the cell are used to record by a plurality of simultaneous scans, characters, graphical data or other form of information which is representative of the stored information on the photosensitive medium.

29 Claims, 7 Drawing Figures

R. A. SPAULDING
R. D. PICKERING
INVENTORS

ACOUSTOOPTIC SCANNER APPARATUS AND METHOD

This is a continuation of application Ser. No. 132,955, filed Apr. 12, 1971, now abandoned.

FIELD OF THE INVENTION

The present invention relates to an acoustooptic scanning apparatus and method and more particularly to an acoustooptic scanning apparatus and method for generating a plurality of simultaneous scanning beams such that graphic information representative of stored information can be recorded therewith.

BACKGROUND OF THE INVENTION

A need has existed for a low-cost computer output recording apparatus and method which has a character writing speed of approximately 4,000 characters per second upwards to 1,000,000 characters per second and more, particularly for a speed of approximately 40,000 characters per second which is suited to the state of the art apparatus. The apparatus and method should be capable of use with a relatively insensitive dry-processed photographic recording medium such as, for example, microfilm. The laser scanner of the present invention fulfills this need in a novel and simple manner.

To better understand the invention, brief reference is made to several prior art systems. Typical of the prior art devices is U.S. Pat. No. 3,324,478 to Jacobs and entitled, "Oscillographic Recording with Coherent Light". The Jacobs device utilizes an acoustooptic cell to deflect a coherent beam of light by Bragg reflection in accordance with the value of an input signal to the cell. Thus, an oscillographic recording can be made. However, only one frequency can be induced within the acoustooptic cell at any point in time in this device. Therefore, the cell emits only one diffracted beam of light which continuously varies in amount of deflection in accordance with the variation in frequency induced in the cell. It is readily apparent that only one scanning beam at a time can be provided by this device and that no provision is made to induce a plurality of separate and distinct frequencies simultaneously on the cell to produce a plurality of simultaneous light beam outputs. Furthermore, it is clear that this device is not adapted or designed to provide an output from a storage medium but is rather merely a convenient means for recording the deflection of a galvonometer coil.

Another prior art device is that disclosed by U.S. Pat. No. 3,397,605 to Brueggemann and entitled, "Frequency Modulated Radiant Energy Scanner Employing Cavitation-Induced Diffraction". This device, as the title indicates, relies upon cavitation forming bubbles in a liquid cell as a diffractor. One frequency at a time is used since varying bubble spacing is what variably diffracts the input beam. The cavitation effect is an entirely different phenomenon from that utilized by the present invention. The cavitation cell requires a higher energy input to a liquid cell than does the acoustooptic cell of the present invention. It is also evident that a solid cell cannot be utilized by the Brueggemann device. In addition, scanning, as in many other prior art devices, is accomplished with changing the diffraction angle by varying the frequency applied to the cell rather than by the inexpensive and efficient mechanical scanning means used in accordance with the present invention. In fact, this type prior art device is not adaptable for use with mechanical scanning means since the cell itself accomplishes the scanning with a variable single frequency control and this limits the scan to a single beam.

Yet another prior art device is that disclosed in U.S. Pat. No. 3,531,184 to Robert Adler entitled, "Acoustical Light Signal-Translating Apparatus". This device scans by using successive Bragg reflections of one light beam passed through two acoustooptic cells. Variable frequencies are imposed on the acoustooptic cells through which the light beam is passed to effect a raster type scan. By reason of the change in frequencies, the single diffracted beam scans in two directions within a plane. The raster scanning motion is achieved by incrementally changing the amount of diffraction in one cell and by synchronizing this change with the cycle of the other variable frequency such that two dimensional raster type scanning, such as achieved in a cathode ray tube results. Again, in this prior art device, as in the above mentioned prior art devices there is only one diffracted beam output at any time. In order to achieve the two dimentional region of scan, two separate acoustooptic cells, frequency generators and transducers are required. The resulting output is very similar to the recording oscillograph of Jacobs in that only one output beam at a time records a path on a recording medium or other receiving means. There is no disclosure of a way to simultaneously generate a plurality of output beams to achieve character writing with a single scan of a plurality of beams as with the present invention and it is very clear that no such use is achievable with, or contemplated by, the Adler device.

In accordance with the invention, a light source, for example, a helium neon gas or other type of laser is used to pass a light beam through an acoustooptic cell, which is preferably of water, although other materials including solids suffice, and which is used as a modulator and character height deflector. Unmodulated light transmitted through the modulator is blocked by a mask or other equivalent deflecting means. A scanner directs the modulated beams to a receiving medium. The scanner is preferably a rotating prism, but can also be a single flat mirror, mirror wheel or other rotating reflective device. Receiving medium motion can alternatively be used to fully or partially provide relative beam-to-recording medium motion. Relatively simple electronic circuitry, some of which is readily available and the rest of which can easily be fabricated onto a circuit card, is used for controlling the acoustooptic cell and scanner. In addition, low-precision, low-cost mechanical components are sufficient for use with this device.

As used herein, the terms light, optical and sound or acoustic are most general. That is, light or optical embraces ordinary visible light waves as well as electromagnetic wave energy at wavelengths above and below the visible portion of the spectrum. The term acoustic, as well as sound, refers to propagated wave energy and includes not only that in the audible range, but also wave energy up to and including, for example, the microwave frequencies which includes the untrasonic frequencies of the preferred embodiment.

One object of this invention is to provide an apparatus and method for high-speed recording of stored information onto a photosensitve or other recording medium.

Another object of this invention is to provide a plural beam information recording system wherein every beam is discretely positioned and modulated.

Yet another object of this invention is to provide a printout record of one line of character information per scan on a photostorage medium which can be moving.

It is still another object of this invention to provide a method of, and apparatus for, high-speed recording of characters and other forms of information, such as graphic, picture, charts and drawings from computer storage.

It is yet another object of this invention to provide an information display system wherein a simultaneous plurality of light elements provide the readout.

One advantage of the present invention is that an array of light elements corresponding to character height is generated simultaneously rather than one at a time as in prior art system to thus provide an increase in information recording rate with a corresponding decrease in energy density per light element.

Another advantage of the invention is that the recording can be of one complete line of characters at a time across an area of recording medium at very high speed.

Another advantage of the invention is that relatively inexpensive mechanical scanning components can be used in practicing the invention, thereby reducing the cost and complexity of a recording device.

Yet another advantage of the invention is that relatively insensitive dry-processed microfilm can be used as a recording medium.

SUMMARY OF THE INVENTION

The acoustooptic readout and printout device and method of the present invention comprises a light source such as a helium neon gas laser, and an acoustooptic cell. The acoustooptic cell is responsive to an attached ultrasonic transducer(s) which is controlled by a plurality of fixed frequency oscillators responsive to a plurality of electrical signals bearing information. Thus, a plurality of frequencies from the oscillators are imparted to the cell through the transducer in response to the information. The information may be derived from a generator electrically connected to the output from a computer or other information storage source and converts information from the source into the printout format. Light emitted from the light source is passed into the acoustooptic cell. Transmitted from the cell are a plurality of output beams of diffracted angles determined by the frequencies impressed on the cell by the oscillator controlled transducer(s). The diffracted beams may be transmitted by a scanner, such as a rotating, transparent polygonal prism, which images the beams as light elements on a photosensitive or other reading medium in a character or other information format.

Still other objects and advantages of the invention will be readily apparent to those skilled in the art from the following description and appended claims with reference to the drawings in which like characters denote like parts and wherein:

DETAILED DESCRIPTION OF THE INVENTION

Figures 1, 2:
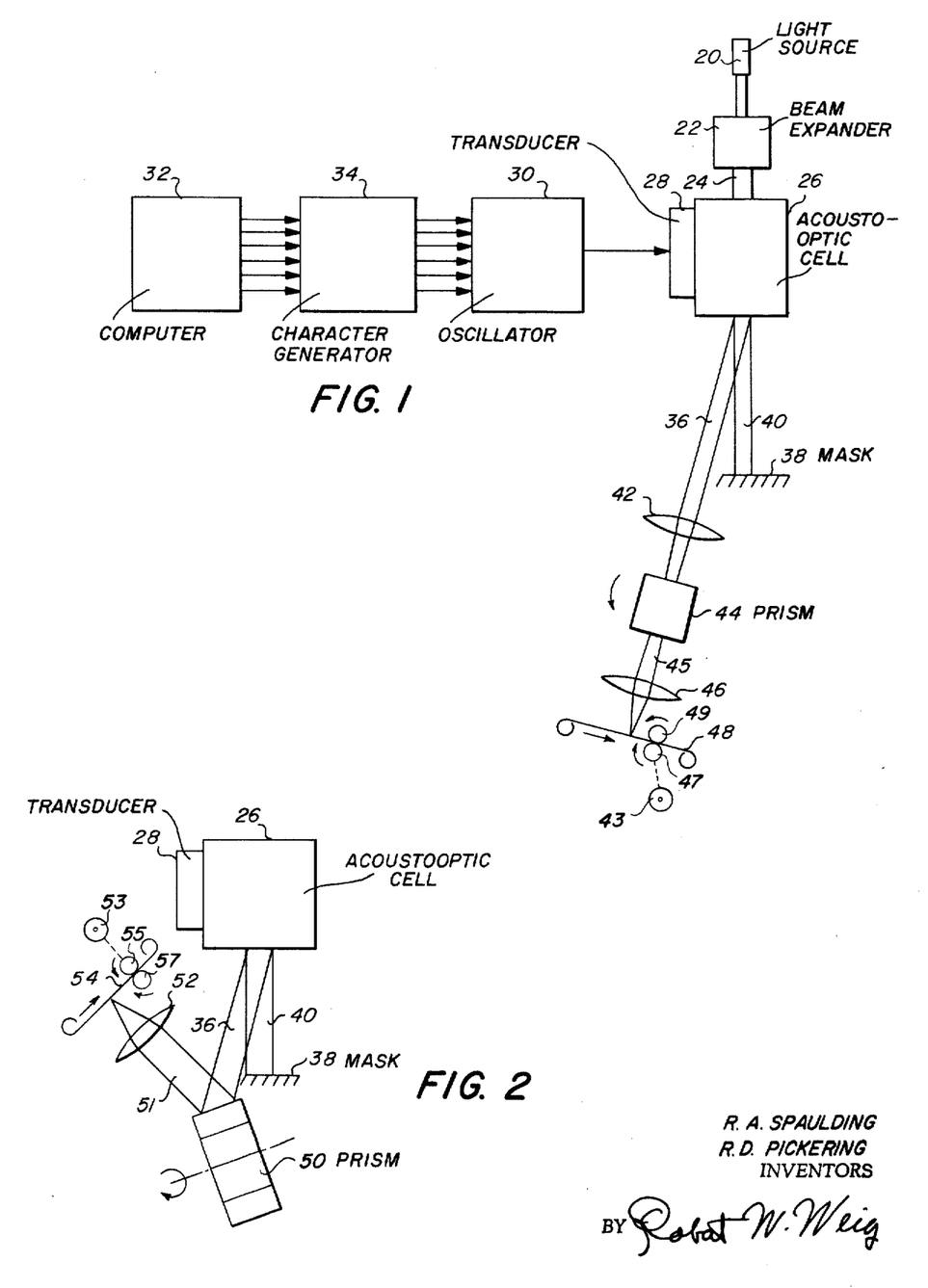
FIG. 1 is a schematic representation of a preferred embodiment of the invention.
FIG. 2 schematically shows an alternative way to scan with the modulated light beams.

Turning first to FIG. 1, a preferred embodiment of the present invention is shown. A source of light 20 which is preferably a helium neon gas laser produces an output beam which is directed into a beam expander 22 which transmits an output beam 24 of the desired diameter. In the preferred embodiment, the beam expander is Model No. 311, manufactured by Spectra-Physics. Collimated light, such as that from a laser is preferably used, since it is sufficiently intense to allow the use of a less sensitive direct print out material as the photosensitive medium. Processing for the photosensitive medium is not needed and very insensitive dry-processed microfilm is sufficient if a laser is used, since the laser light is intense enough to record very clear, visible elements thereon without any chemical processing. However, wet-processed, or other type mediums, can be used within the scope of the invention. The laser or other source of light used with the system can be any source of relatively intense, collimated light which need not be coherent or polarized and which is of a monochromatic wavelength suitable to expose the associated photosensitive medium. Too, solid-state lasers are as suitable as the gas laser of the preferred embodiment.

An acoustooptic cell 26, which may be a Bragg light-sound interaction cell, is positioned to receive the expanded beam 24. It will be appreciated that the acoustooptic cell 26 can be fabricated from optically transparent material which can either be liquid or solid and which conveys traveling or standing ultrasonic waves, producing a photoelastic interaction therein. Water is a common material for this use and works well up to 50 megahertz. Solid materials, such as $PbMoO_4$ and $LiNbO_3$ are useful at higher frequencies. Glass acoustooptic cells can also be used. The side on which the transducer is mounted is preferably not parallel to its opposite side to avoid standing acoustic waves. A plastic container is preferably used to hold a water type cell, since it absorbs sound rather than reflects it back into the cell.

Operatively connected to acoustooptic cell 26 is an ultrasonic transducer 28 which is responsive to a plurality of fixed frequency driving or gated character signals produced by a corresponding plurality of individual oscillators or a multiple frequency oscillator 30. Alternatively, the plurality of frequencies can be introduced into the acoustooptic cell by a plurality of transducers, each responsive to an oscillator of a chosen frequency. Indium bonding of the transducer on the $PhMoO_4$ cell is particularly efficient since it is a thin and strong bond which transmits the transducer output well. Information desired from an information or control signal source such as computer 32 is fed into a character or gate signal generator 34 where the information, since it is normally stored in another form, such as binary coded decimal, is converted to alphanumeric character or other recording format. The character generator of the preferred embodiment is an integrated circuit for producing a 5 × 7 output matrix and is Model No. TMS-4103, manufactured by Texas Instruments, Inc. Other character generators which generate any desired output matrix, such as 7 × 9, 12 × 16 or 16 × 20, can also be used. Exemplary of such alternatives is a generator for producing a 7 × 9 output matrix, identified as Model No. EA-4001, manufactured by Electronic Arrays, Inc. The storage unit need not be a computer but can be magnetic tape, magnetic disc, other magnetic, electrical, mechanical, photographic, optical or other type of storage device.

The multiple frequency oscillator 30 is controlled by the output from the character generator 34 such that oscillator 30 produces a plurality of distinctly characteristic frequency outputs in accordance with the character being generated. The electrical frequencies generated by oscillators 30 are correspondingly reproduced as ultrasonic frequencies by the ultrasonic transducer 28 which produces frequencies within acoustooptic cell 26 that will modulate the light beam 24 passing therethrough by Bragg reflection to form a modulated light output 36 comprising a plurality of diffracted light beams of distinctly characteristic frequencies which correspond to the plurality of distinctly characteristic frequencies produced by the ultrasonic transducer 28. For the water cell, the frequencies used are centered at 40 megahertz and are approximately 0.5 megahertz apart. Thus, for a 5 × 7 matrix, the seven frequencies are approximately 38.5, 39.0, 39.5, 40.0, 40.5, 41.0 and 41.5 megahertz. However, any operative frequency can be used and a ragne of 10 to several thousand megahertz is usable.

The apparatus and method in accordance with the invention are based upon the assumption that the acoustooptic interaction is a linear process; i.e., the optical power in the diffracted order is linearly proportional to the acoustic power developed by the transducer. A complete derivation of the process appears in the literature. For purposes of understanding how the invention operates, a simplified relation is set forth below. The acoustooptic diffraction efficiency for a given order is the ratio of diffracted output ($I_1$) to input optical intensity ($I_o$):

$$\frac{I_1}{I_o} = \sin^2 \left( 1.4 l \sqrt{M_w P_s} \right), \quad (1)$$

where $l$ is the interaction length in meters, $M_w$ is the acoustooptic figure of merit relative to water, and $P_s$ is the acoustic power density in watts per square meter. In the practical situation of a water acoustooptic cell with a 1 cm transducer length and $M_w = 1$, we have $$\frac{I_1}{I_o} = \sin^2 \left( 1.4 \times 10^{-2} \sqrt{P_s} \right). \quad (2)$$

The function $\sin \Theta$ differs from $\Theta$ by 1% when $\Theta \leq 14°$ (0.24 radian). Making the assumption that $\sin \Theta = \Theta$ for $\Theta \leq 14°$, we write the linear approximation $$\frac{I_1}{I_o} = \left( 1.4 \times 10^{-2} \sqrt{P_s} \right)^2 = 1.9 \times 10^{-4} P_s. \quad (3)$$

On the basis of our assumption, this expression is valid for a diffraction efficiency up to $(0.24)^2 = 5.8 \times 10^{-2}$ or 5.8%. The acoustic power density at this efficiency is $$P_s = \frac{5.8 \times 10^{-2}}{1.9 \times 10^{-4}} = 300 \text{ watt } m^{-2} \quad (4)$$

For a transducer of 1 cm² area, this would correspond to an acoustic power of about $3 \times 10^{-2}$ watts.

For the above conditions, equation (3) reveals that the process can be described by a linear approximation; hence, linear superposition applies. Thus, many different frequencies can be applied to the transducer, and each will produce its own diffraction spot in the image plane.

If diffraction efficiencies greater than about 6% are required, the linear approximation becomes invalid and the possibility of nonlinear effects increases. Careful measurements of optical spot interaction should be made to determine if the effects are detrimental in practicing the invention.

A blocking mask 38 or equivalent selective light-stopping device is positioned so as to intercept or block the undiffracted light 40 transmitted by the acoustooptic cell 26. The plurality of light beams of output 36 is imaged by an imaging element such as lens 42 as a row of elements of light onto a device giving scanning motion to the light such as rotating polygonal prism 44, which rotates on an axis in the plane of the paper and perpendicular to the optical axis of the system. The diffracted beams 45 corresponding to the beams of output 36 passed by rotating prism 44 are imaged by an imaging element such as lens 46 onto a photosensitive medium 48 to form lines of character information thereon. As seen in the drawing, these lines of information are perpendicular to the paper. The photosensitive medium is driven in stepped or continuous fashion by motor 43 throgh rollers 47 and 49.

Referring now to FIG. 2, an alternative embodiment of the scanner of FIG. 1 is shown. Ultrasonic transducer 28 and acoustooptic cell 26 are again used to produce an output 36 comprising a plurality of diffracted light beams. The undiffracted light 40 is blocked by mask 38. The beams of output 36 are directed onto a mirror wheel 50 which rotates to produce a scan of light beams 51 focused through a focusing device such as lens 52 onto a photosensitive medium 54. In the perspective showing of the drawing, the lines of information recorded on the photosensitive medium 54 are perpendicular to the direction of paper movement and the medium 54 is moved continuously or stepped by motor 53 acting on rollers 55 and 57.

Figures 3, 4:
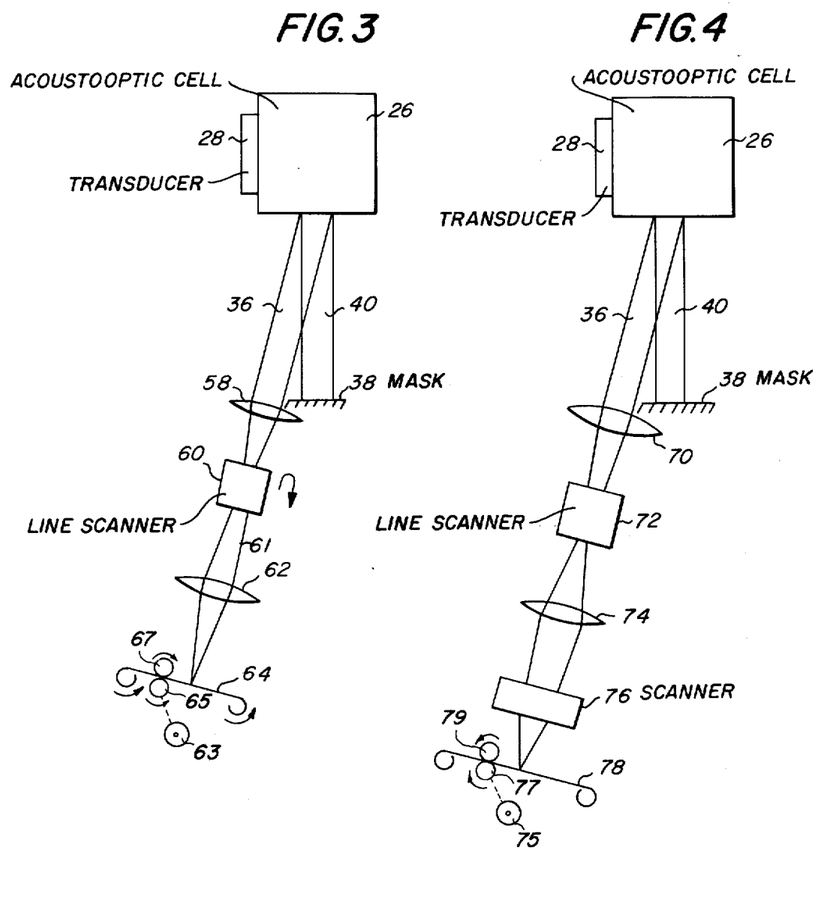
FIG. 3 schematically shows another optional way to scan with the modulated light beams relative to the photo-sensitive medium.
FIG. 4 is a schematic representation of yet another alternative manner of scanning a photosensitive medium with the modulated light beams.

FIG. 3 shows another alternative way of scanning in accordance with the present invention. As in FIGS. 1 and 2, acoustooptic cell 26, as controlled by ultrasonic transducer 28, transmits a plurality of diffracted light beams in output 36. The undiffracted light 40 is again blocked by mask 38. The diffracted beams of output 36 are focused through a focusing device such as lens 58 onto a line scanner 60 which can be a rotating polygonal prism such as 44, a flat mirror, or a mirror wheel such as 50, the axis of rotation of scanner 60 being in in the plane of the paper of the drawing. Line scanner 60 may also comprise an acoustooptic or electrooptic deflection device. The light output 61 of line scanner 60 is focused through a focusing device such as lens 62 onto a recording medium 64 which is itself provided with a continuous or stepped motion by any well-known means such as a film drive motor 63 and rollers 65 and 67. After a line of characters is recorded, the recording medium is moved by the drive to present a fresh surface for recording.

Reference is now made to FIG. 4, wherein another optional scanning device is shown. As before, ultrasonic transducer 28 controls the frequencies within acoustooptic cell 26 to form a plurality of diffracted light beams as output 36. Undiffracted light 40 is once again blocked by mask 38. The diffracted light beams of output 36 are directed through a focusing device such as lens 70 which directs the beams onto a line scanner 72 which can be a device such as 44, 50 or 60. From line scanner 72, the beams are directed through a collimating element such as lens 74 and onto an additional scanning device 76 which can be a mirror, prism, lens or another acoustooptic beam deflector which positions the scan lines at any selected region of a stationary piece of photosensitive material 78, such as microfiche. Using this embodiment of the invention, several pages of a document, such as a U.S. patent, can be recorded adjacent to one another on a microfiche. The recording medium can be controlled by a directional control device 75 and a film moving means such as rollers 77 and 79.

Figures 5, 6, 7:
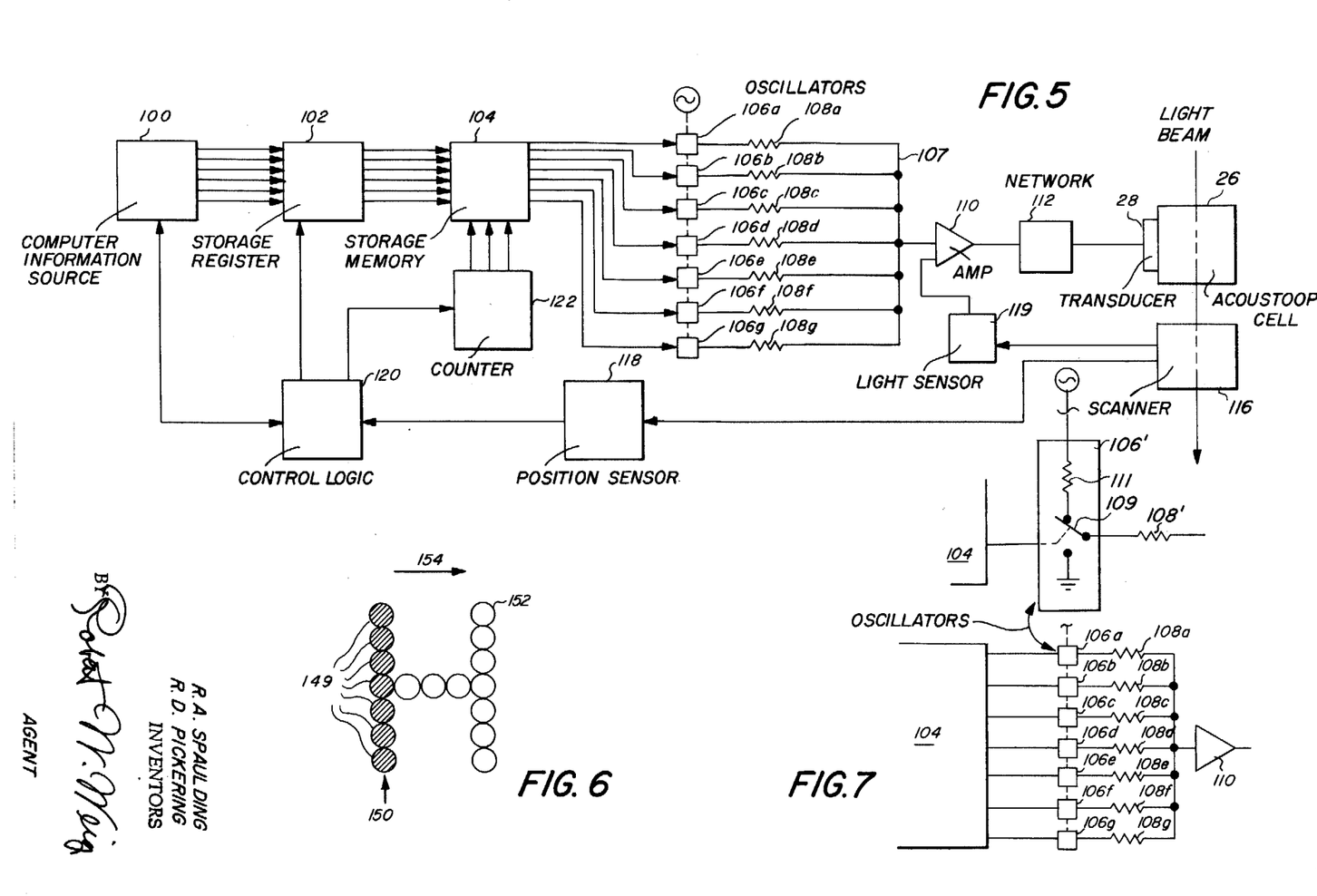
FIG. 5 is a schematic representation of a system incorporating the invention.
FIG. 6 is an enlarged showing of a representative character printout on a photosensitive recording medium.
FIG. 7 is a more detailed schematic showing of the oscillator control circuitry of FIG. 5.

Referring now to FIG. 5, a schematic showing of a system embodying the present invention is seen. A computer information or control signal source 100 provides storage for readout. This storage may be a magnetic core memory, tape, discs or any other well-known device which is part of a computer or used in peripheral conjunction therewith. The particular storage and the particular computer used incorporating it or operationally connected thereto, per se, are not part of this invention and therefore no more detailed reference is made thereto. Since information stored in digital computers is generally in binary form, the initial output from computer information source 100 is preferably in a binary coded decimal form but can be in any equivalent form and can represent, for example, a letter of the alphabet or arabic digit which can be printed as such on a photostorage medium. As is well known to those skilled in the art, pictures, graphs and charts which can be printed out in accordance with the invention can also be stored in binary form. The coded storage character which is preferably represented by a six-bit binary code outputs to temporary storage register 102 which comprises the standard integrated circuits commercially available. Character storage memory 104 receives the output from the temporary storage register 102 and preferably converts this to an output or gate signals format comprising seven outputs representing the seven elements or levels 149 of a vertical character column 150 of the character to be printed as seen with reference to FIG. 6. The general character format shown in FIG. 6 is designated 152 and comprises a 5-by-7 matrix of elements 149. It has been determined that a 5-by-7 matrix is adequate, although 7-by-9 or 15-by-20 or other size matrix may be used as a matter of choice. The seven information channel outputs from character storage memory 104 are converted by fixed frequency modulated oscillators 106a–106g into fixed electrical carrier frequencies which are individually either on or off as controlled by character generator 104.

The oscillators can be controlled by the character generator 104 selectively turning them on and off. However, referring to FIG. 7, it is preferred for reasons of simplicity and speed that the oscillators run continuously in which state they can be selectively disconnected as designated by switch 109 being in the off position (not shown) and selectively engaged into the circuit as shown by switch 109 being in the on position as shown. Oscillator 106' represents any one of oscillators 106a–106g and resistor 108' represents any one of the corresponding resistors 108a–108g. Oscillator impedance is indicated by resistor 111. Switch 109 can be any suitable electrical switching device, although in the preferred embodiment it comprises electrically controlled silicon diodes.

Yet another alternative is to use a multi-frequency oscillator which can generate the selected frequencies continuously. In such a case, character generator 104 controls which frequencies are engaged at any point in time. A multi-frequency generator which can be controlled so as to produce selected ones of the plurality of frequencies, can also be used.

Whichever oscillator embodiment is used, the plurality of frequencies is combined by a summing network 107 to form a complex electrical or driving signal which is impressed upon the ultrasonic transducer 28 through a power amplifier 110 and matching network 112 which matches the impedance of transducer 28 to the power amplifier 110. Instead of being summed, the frequencies could be multiplexed as a matter of choice. Although a resistive summing network is shown, any other suitable method of combining several electrical signals such as transformers can be used. The ultrasonic transducer 28 translates the electrical signal into acoustic waves which are directed into acoustooptic cell 26. The acoustic waves within the cell correspond to the fixed frequency electrical signals produced by oscillators 106a–106g. Because of the properties of Bragg reflection in the acoustooptic cell, as previously explained and which were particularly discussed by Robert Adler in an article in the *IEEE Spectrum* of May 1967, pp. 42–54, entitled, "Interaction of Light and Sound", every one of the individual acoustic frequencies interacts independently with the light beam 24 within the acoustooptic cell 26 to modulate and form a phase grating for diffracting a first order beam of light for every frequency present therein. The position of any one of the elements is a function of the frequency producing it and can be adjusted by changing the frequency of the corresponding oscillator. The number of light beams which can be produced simultaneously, and therefore, the number of elements 149 in the character vertical column 150 is equal to the resolution of the acoustooptic cell, which is approximately equal to $\Delta f \tau$; where $\Delta f$ is the useful frequency range of the attached transducer and $\tau$ is the time required for an acoustic wavefront to pass across the optical beam. Hence, for elements 149 on the photostorage medium to be printed adjacent to one another, the individual oscillators are set to frequencies differing by approximately $1 \sqrt{\tau}$.

In practicing the invention, the frequencies can be fixed so as to produce separate and distinct or selectively overlapping elements of light 149 as desired by the practitioner. Thus, the light elements can be positioned so as to be separated or to overlap or for some to be separated and others to overlap upon a receiving means such as a photostorage medium. Frequency selections are readily made as a matter of choice since the frequencies of the oscillators 106a-106g determine the frequencies in the acoustooptic cell 26. The frequencies when properly adjusted position the light elements relative to one another on the receiving means so as to produce a clear character print on the photostorage medium. Every light element 149 at a particular height position in a vertical character column 150 on the photostorage medium represents one frequency. Too, every light element is independently controlled to be on or off, i.e., to form light or leave dark corresponding individual light element receiving areas on the photostorage medium in accordance with whether or not the corresponding modulating oscillator for that element is on or off. The row of light elements is preferably scanned in the direction 154, that is, horizontally relative to vertical character columns or increments 150 by the scanner 116 which can be the rotating scanner 44 of FIG. 1 or one of the alternative scanners shown in FIGS. 2, 3 and 4 of the instant specification. In this manner, a line of character information can be readily recorded on a photostorage medium in a single scan. Between scans, the recording medium can be stepped to provide a fresh surface or a continuously advancing storage medium drive can be used. It will be apparent that one scan is all that is required to record an entire line of information since the seven or other number of vertical character column elements 149 of a vertical character column or increment 150 are produced simultaneously by the corresponding plurality of seven light beams. The number of vertical elements or levels 149 in any one column 150 is determined by the number of oscillators used which, in the preferred embodiment case, is seven as is shown in FIG. 6. The character storage memory output 104 determines whether or not for a particular element 149 the output of the corresponding oscillator 106a-106g is introduced to the transducer 28 for any one vertical character column 150. Scanner 116 outputs to a position sensor 118 which can be any one of such devices well known to those of ordinary skill in the art and it usually has a photocell input for using a light beam to synchronize the mechanical scanner 116 with the character storage memory readout. The output of position sensor 118 is directed to a sequence control logic 120 which controls what information is next selected from the computer 100 by temporary storage register 102. The sequence control logic 120 also controls a counter 122 for selecting the next character column or increment 150 to be recorded. Counter 122 controls the sequence of the vertical character columns 150 of the character being recorded.

Laser output variations can vary the intensity of light available at the recording medium for exposure. In accordance with the present invention, this can be corrected by using a light sensor 119 to sample output and to apply a correction signal to vary the gain of the amplifier 110. Thus, the intensity of all the beams is changed simultaneously to compensate for the change in laser output.

The preferred embodiment in accordance with the invention is adapted to record information stored by a computer onto a photostorage medium such as microfilm. This operation is known as computer output microfilming. The invention may be equally useful in other applications such as those for recording or displaying information. For example, the photosensitive medium may be replaced by projecting optics and a viewing screen to provide a display of information for direct observation by a viewer.

The invention can also be used with grapic data printout graphs, drawings or other nonalphanumeric information by simply adjusting the scan lines so that they overlap continuously in two dimensions.

The amplitudes of individual beams can be linearly controlled to produce gray-scale modulation of the recorded elements.

If the individual oscillators are phase-locked with a correct selection of relative phases, the peak amplitude of the resulting composite wave form can be reduced, making possible higher average power in the wave form without distortions caused by amplifier and other system nonlinearities.

The production of a plurality of image elements by the acoustooptic cell is based on its linear operation which occurs for low diffraction efficiencies of the cell, i.e., up to at least a few percent. If very large diffraction efficiencies of the cell are required, nonlinear operation may occur and plural images may no longer be independent of one another.

Interactions between plural images can be compensated by oscillator switch 106' shown in FIG. 7. By selecting specific impedances 108' and 111 for the oscillators 106a-106g, variations in image intensity caused by switching a variable number of oscillators off can be cancelled by the changing network impedance resulting from the two switch positions. Thus, acoustooptic deflection efficiencies much greater than 10 to 20 percent can be achieved with preservation of character quality.

Acoustic waves are generally traveling waves and are absorbed at the side of the acoustooptic cell opposite the transducer(s). It will be appreciated that standing waves can be used to increase diffraction efficiency. The length of the acoustooptic cell in the direction of acoustic wave motion can be chosen such that the cell is resonant at frequencies for producing beams which record the desired elements.

The invention has been described in detail with particular reference to certain preferred embodiments thereof, but it will be understood that variations and modifications can be effected within the spirit and scope of the invention.

We claim:

1. A method of translating information from a plurality of information signals, each independently varying in amplitude with time, respectively to a link plurality of output light beams, and wherein a coherent light beam is utilized as a light source, comprising:
   generating a plurality of carrier signals corresponding in number to said plurality of information signals, said carrier signals each being of a frequency different from those of the other carriers;
   modulating in amplitude each of said carrier signals in accordance with a respective one of said information signals;
   Bragg-diffracting at least part of said source beam into a corresponding plurality of angularly-discrete diffracted output light beams, each intensity-modulated in accordance with a respective one of said information signals;
   and maintaining the maximum signal intensity of each of said diffracted beams substantially independent of variations in the intensity of the remaining diffracted beams.

2. Apparatus for recording on a light-sensitive medium arranged in a recording station, information derived from a storage source, said apparatus comprising:
means for producing a beam of collimated light;
format generating means for receiving derived information from such storage source and for converting the derived information into a format which comprises a plurality of successive increments, each increment comprising a number of elements, the number of such elements in each successive increment depending upon the characteristics of the derived information;
plural frequency oscillator means for receiving the converted information from said format generating means and for generating an electrical signal having a plurality of different fixed frequencies, with each fixed frequency corresponding to a different one of said elements in each of said successive increments;
means, including an acoustooptic cell arranged in the beam of light and responsive to said electrical signal from said oscillator means, for simultaneously forming a light beam set comprising a diffracted light beam of a unique diffracted angle for each fixed frequency in said signal; and
means for simultaneously imaging the diffracted light beams on the medium.

3. Apparatus in accordance with claim 2 further comprising means for scanning said diffracted light beam sets in at least one direction relative to said medium in said recording station.

4. Apparatus in accordance with claim 3 wherein the scanning means comprises: a first means for scanning successively diffracted light beam sets in said one direction relative to the medium; and a second means for changing the position of said diffracted light beams relative to the medium in another direction.

5. Apparatus in accordance with claim 4 wherein said first and second systems include optical members rotatable in synchronism and in directions for recording parallel, spaced lines of information in a predetermined area of said medium.

6. Apparatus in accordance with claim 3 further comprising means for intermittently moving said medium through said recording station in a direction that is normal to said one direction after a predetermined number of said increments have been recorded on said medium in said one direction.

7. A multiple-beam alphanumeric imaging system utilizing a single coherent-light source beam for the generation of characters having a predetermined number of parallel levels and receptive to control signals bearing said character information, comprising:
means responsive to said control signals for generating a plurality of gate signals each corresponding to a respective one of said parallel character levels;
a corresponding plurality of ultrasonic carrier signal sources each of a single discrete frequency different from those of the other carrier signals and all spaced in frequency from one another by a uniform equal interval;
means for respectively applying said gate signals to said carrier signal sources for gating said carrier signals ON and OFF in accordance with said signal;
a Bragg light-sound interaction cell interposed in the path of said source beam, and responsive to an applied driving signal to diffract at least part of said source beam into one or more discrete diffracted beams at diffraction angles dependent on the frequency components of said driving signal;
and means for utilizing said gated carrier signals as said driving signal for said Bragg cell to generate a corresponding plurality of independently gated light output beams.

8. An imaging system as in claim 7 which further includes:
a computer output having a plurality of channels each of which supplies one of said control signals.

9. An imaging system as in claim 8 in which said computer channels supply said control signals in a binary code, and in which said means for generating said gate signals decodes said binary code to supply said plurality of gate signals in accordance with said code.

10. An imaging system as in claim 7 which further includes means for scanning said diffracted means in a direction transverse to that of the diffraction of said source beam by said Bragg cell at a rate in accordance with the rate of delivery of said character information by said control signals to generate said characters.

11. An imaging system as in claim 7 which further includes:
means for maintaining the intensity of each of said diffracted beans substantially independent of changes of intensity in the remaining ones of said diffracted beams.

12. A system as in claim 11 in which said intensity-maintaining means comprises means for limiting the efficiency of said Bragg cell to approximately 25 percent or less.

13. A system as in claim 11 in which said intensity-maintaining means comprises means for variably attenuating said diffracted beams in response to the attenuation of said carrier signal sources.

14. A system as in claim 11 in which said intensity-maintaining means comprises means for variably attenuating the intensity of said beam at every moment in accordance with the number of said carrier signal sources which are actuated at that moment.

15. A system as in claim 7, which further includes means positioned in the path of said light beam preceding said cell for causing said beam to be collimated as it passes into said cell.

16. A multiple-beam information-translation system utilizing spatially coherent source light beam and responsive to a plurality of information signals each independently varying in amplitude with time, comprising:
a plurality of carrier signal sources corresponding in number to said plurality of information signals, said carrier signals each being of frequency different from those of the other carriers;
a corresponding plurality of modulators each amplitude-modulating one of said carrier signals in accordance with a respective one of said information signals;
a Bragg light-sound interaction cell interposed in the path of said source beam, said cell being coupled to said plurality of modulators and responsive to said amplitude-modulated carrier signals to diffract at least part of said beam into a corresponding plurality of angularly discrete diffracted light beams, each intensity-modulated in accordance with a respective one of said modulated carriers;
and means for maintaining the intensity of each of said diffracted beams substantially independent of variations in the intensity of the remaining diffracted beams.

17. An information-translation system as in claim 16 wherein said plurality of information signals are together representative of image information;
and which further includes means for scanning said diffracted beams in a direction transverse to that of the diffraction of said source beam by said Bragg cell at a rate in accordance with the rate of information delivery by said information signals to generate said image information.

18. A system as in claim 16 in which said means comprises means for limiting the efficiency of said Bragg cell to approximately 25 percent or less.

19. A system as in claim 16 in which said intensity-maintaining means comprises means for attenuating the intensity of said diffracted beams at every moment in accordance with the number of said carrier signal sources which are actuated at that moment.

20. A system as in claim 16, which further includes means positioned in the path of said light beam preceding said cell for collimating said bean before its passage into said cell.

21. A system as in claim 16, in which said intensity-maintaining means comprises means for adjusting the intensity of each of said diffracted beams in a first sense when the total intensity of the remaining beams changes in the opposite sense.

22. A system as in claim 16, in which said intensity-maintaining means comprises means for attenuating each of said diffracted beams in response to a diminution in the total intensity of the remaining beams.

23. Apparatus for generating diffracted light beams corresponding to coded information contained in a plurality of information signals; said apparatus comprising:
means, responsive to said information signals, for producing a series of sets of electrical signals, each set of electrical signals having a plurality of concurrent electrical signals varying independently in accordance with the coded information of said information signals;
plural frequency oscillator means, responsive to said electrical signal sets, for generating carrier signals having a plurality of different fixed frequencies, each fixed frequency corresponding to a different one of said concurrent electrical signals; and
means, including a simultaneous multi-beam acoustooptical cell, responsive to said plural frequency carrier signals for simultaneously forming diffracted light beams corresponding in number to the number of said fixed frequencies, each of said diffracted light beams having a diffraction angle uniquely associated with one of said different fixed frequencies.

24. Apparatus as defined in claim 23 further comprising a storage source having a plurality of outputs, each of said outputs supplying one of said information signals.

25. Apparatus as defined in claim 24 wherein:
said storage source supplies said information signals in a binary code; and
said means for producing said sets of electrical signals includes means for decoding said binary code.

26. Apparatus as defined in claim 23 further comprising means for scanning said diffracted light beams in a direction transverse to that of the diffraction by said acoustooptical cell as a rate in accordance with the rate of delivery of said information by said information signals.

27. Apparatus as defined in claim 23 further comprising means for maintaining the intensity of each of said diffracted beams at a constant intensity.

28. Apparatus for use with a spatially coherent light beam and responsive to a series of sets of electrical signals, each set of electrical signals having a plurality of concurrent electrical signals varying independently; said apparatus comprising:
plural frequency oscillator means, responsive to said electrical signal sets, for generating carrier signals having a plurality of different fixed frequencies, each of said fixed frequencies corresponding to a different one of said concurrent electrical signals; and
means, including an acoustooptical cell interposed in the path of said light beam, responsive to said plural frequency carrier signals for diffracting at least part of said light beam into a plurality of angularly discrete diffracted light beams corresponding in number to said fixed frequencies.

29. Apparatus as defined in claim 28 further comprising means for scanning said diffracted light beams in a direction transverse to that of the diffraction by said acoustooptical cell at a rate in accordance with the rate of delivery of said sets of electrical signals.

* * * * *

UNITED STATES PATENT OFFICE
CERTIFICATE OF CORRECTION

PATENT NO. : 4,000,493
DATED : December 28, 1976
INVENTOR(S) : Richard A. Spaulding and Royce D. Pickering It is certified that error appears in the above-identified patent and that said Letters Patent are hereby corrected as shown below:

Column 10, line 52, "link" should read -- like --.

Signed and Sealed this

Twelfth Day of April 1977

[SEAL]

Attest:

RUTH C. MASON
*Attesting Officer*

C. MARSHALL DANN
*Commissioner of Patents and Trademarks*